United States Patent [19]
Faust

[11] Patent Number: 5,369,228
[45] Date of Patent: Nov. 29, 1994

[54] DATA INPUT DEVICE WITH A PRESSURE-SENSITIVE INPUT SURFACE

[75] Inventor: Benedikt P. Faust, Bonn, Germany

[73] Assignee: Signagraphics Corporation, Los Gatos, Calif.

[21] Appl. No.: 981,353

[22] Filed: Nov. 25, 1992

[30] Foreign Application Priority Data

Nov. 30, 1991 [DE] Germany .................... 4139577

[51] Int. Cl.⁵ .............................................. G08C 21/00
[52] U.S. Cl. ........................................... 178/18; 178/19
[58] Field of Search ...................... 178/18, 19, 20; 340/712, 706, 709; 345/156, 157, 168

[56] References Cited

U.S. PATENT DOCUMENTS

| | | | |
|---|---|---|---|
| 4,636,582 | 1/1987 | Moriwaki et al. | 178/18 |
| 4,786,764 | 11/1988 | Padula | 178/19 |
| 4,798,919 | 1/1989 | Miessler | 178/18 |
| 4,801,767 | 1/1989 | Sato et al. | 178/18 |
| 4,801,771 | 1/1989 | Mizuguchi | 178/18 |
| 4,814,760 | 3/1989 | Johnston et al. | 178/18 |
| 4,859,813 | 8/1989 | Rockwell | 178/19 |
| 4,929,934 | 5/1990 | Ueda et al. | 178/18 |
| 4,963,702 | 10/1990 | Yaniger | 178/18 |
| 5,028,744 | 7/1991 | Purcell | 178/18 |

FOREIGN PATENT DOCUMENTS

| | | |
|---|---|---|
| 0032013 | 7/1981 | European Pat. Off. . |
| 0189590B1 | 8/1986 | European Pat. Off. . |
| 0244698 | 4/1987 | European Pat. Off. . |
| 0288692 | 11/1988 | European Pat. Off. . |
| 0194861B1 | 5/1992 | European Pat. Off. . |
| 2319460 | 4/1972 | Germany . |

*Primary Examiner*—Stephen Chin
*Assistant Examiner*—Vijay Shankar
*Attorney, Agent, or Firm*—Spensley Horn Jubas & Lubitz

[57] ABSTRACT

A data input device having an arrangement of deformable layers including at least a dielectric material above a resistive layer. The material is elastically deformable so that, when pressure is applied to an input surface, the distance between the input surface and the resistive layer is reduced at the pressure point. An electrode which is preferably in the form of a conductive layer is arranged on the side of the deformable layer facing away from the resistive layer. Thus results in a change of the capacitive properties of the deformable layer at the pressure point, since the thickness of the deformable layer is reduced at the pressure point. This capacitive measurement is used for detection of the pressing force, while the position of the pressing point on the input surface is detected in two mutually orthogonal directions on the basis of the voltage divider forming in the resistive layer arrangement.

15 Claims, 3 Drawing Sheets

$$a = \left(\frac{U_{E0} \cdot R_1}{R}\right) \quad \text{FIG. 4B}$$

$$b = \left(\frac{\Delta U_A}{\Delta t} = \frac{U_{E0}}{R \cdot C}\left(1 + \frac{R_1}{R_2}\right)\right) P \sim \frac{1}{C} \quad \text{FIG. 4C}$$

DATA INPUT DEVICE WITH A PRESSURE-SENSITIVE INPUT SURFACE

BACKGROUND OF THE INVENTION

1. Field of the Invention

The present invention is directed to a data input device with a pressure-sensitive input surface.

2. Description of Related Art

By use of such data input devices, it is possible to convert handwritten notes, for example signatures, into computer readable data. Subsequently, these data can be processed by the computer such that the signature trace resulting from the position signals is reconstructable and smoothable to a degree that allows an exact comparison with a signature already stored in the computer.

Devices for data input via pressure-sensitive input surfaces are known from EP-0 032 013 A3 and from U.S. Pat. No. 4,636,582. These devices utilize the so-called "pressure sensitive method", wherein, for evaluation of the signature, the registration thereof is performed solely by the influence of the pressure of a writing instrument on an input surface provided as a sensor. The pen that is to be used therein is supposed to apply a pressure on the input surface of the sensor in such a way that handwritten notes or the signature, respectively, can be recognized as pressure signals by the sensor and passed on to an evaluation circuit. The internal structure of the data input device featuring this sensor is arranged such that it can convert the position of the writing instrument whose tip is pressed on the surface of the input surface or the sensor surface into measurable electric magnitudes, which give a measure for the x- and y-position of the individual pressure- and contact-points of the pen while the signature is produced.

According to EP-0 032 013 A3 and U.S. Pat. No. 4,636,582, the formation of the electric magnitudes is achieved by utilizing a data input device in which a flexible electrically conductive layer is located at a certain distance above a resistive layer. If no pressure is applied, these two layers are separated from each other by an electrically insulating layer. The insulating layer is flexible and is configured such that the insulating layer made by screen printing will be deformed at the pressure point of the writing instrument so that through the grating- or point-like mesh openings a galvanic contact between the upper conductive layer and the lower resistive layer is made. This leads to the formation of a voltage division across the resistive layer, where the partial resistances are given as a function of the position of the pen pressure.

According to EP-0 032 013 A3, it is known that, at the four outer corners of a rectangular resistive layer, voltages are applied interchangingly and the resulting voltage division in the resistive layer is only evaluated in longitudinal and transverse direction of the resistive layer, whereby the respective x- and y-position signals of the pressure point are obtained.

The measurement of the partial resistances of the voltage division is done by DC-voltages applied to the resistive layer, wherein by the trough-like depression generated by the pressure point and by contact of the conductive layer with the resistive layer, the voltage of the divider is sensed.

Thus, after long-term usage of these known data input devices (also referred to as pads), due to the direct contact between the upper conductive layer and the resistive layer, there are observed, in particular, heating and mechanical stress of the flexible insulating layer located between these layers and of the resistive layer. This will result in a shortening of lifetime and decreased reliability of the data input device. This is the case especially because the insulating layer is produced by a screen printing method, wherein nap-like protruding segments, distributed in a screen-printing pattern and made from insulating material, cannot be fixed to an electrically conductive layer in a way satisfying the demands of this application. A further disadvantage of the known data input devices is that a measurement of the pressure with which the writing instrument is pressed onto the input surface, is not possible.

From EP 0 194 861 A2, there is known a data input device comprising a pressure-sensitive input surface wherein, in addition to the detection of the x- and y-coordinates of the pressing point, there is detected also the force of the pressure acting on the pressure-sensitive input surface at the pressure point. Thus, in this device, electric signals are generated which represent both the position of the pressure point within the pressure-sensitive input surface and the pressing force alike. In doing so, the detection of the x- and y-coordinates is performed on the basis of the partial resistances of an arrangement of resistive layers which are obtained between the pressure point and two electrodes, arranged opposite to each other, of this arrangement of resistive layers. The pressing force results from the (contact) resistance between the arrangement of resistive layers and a conductive contact layer which is arranged above the arrangement of resistive layers and on which the pressure point is brought into more or less intensive contact with the arrangement of resistive layers.

EP 0 288 692 teaches another pressure-sensitive data input device for a line generated on an input surface by a writing instrument or the like. In this device, there is used a compressible resistive layer which comprises of individual conductive fibers being in abutting contact with each other. The resistive layer has its four edges provided with electrodes connected to the ends of the conductive fibers. Above and below the resistive layer, there is located a solid conductive layer. By use of the writing instrument, pressure is exerted onto the input surface which is arranged on one side of the combination of the resistive layer and the conductive layer. With increasing intensity of the abutting contact of the conductive fibers, the resulting resistance will decrease correspondingly. The x/y position of the pressure point within the input surface is detected on the basis of the currents through the individual electrodes when current is supplied to the conductive layer. The total magnitude of the current is a measure for the pressure of the writing instrument acting onto the input surface at the pressure point.

From EP-0 189 590, there is known a device for the input of information by a writing instrument with simultaneous display of this information. This device comprises two groups of strip electrodes arranged at a distance from each other, i.e. mutually parallel row electrodes and also parallel column electrodes extending orthogonally thereto. The space between both electrode groups is filled with a liquid crystal. Each of the row and column electrodes is provided with a driver. The column electrodes further comprise an input sensor connected in parallel to the driver. All of the electrodes are driven according to the time-division multiplex method. In addition, the input sensors are scanned sucessively. The drive and control electronics required for these processes is relatively complex. By the writing instrument, the distance of the column electrodes to the row electrodes is locally reduced whereby the resistance and/or the capacitance in the area where the column electrodes exposed to the writing pressure cross the row electrodes, is changed. This is detected by the input sensors. By corresponding control of the thus localized electrodes via the associated drivers, the liquid crystal layer is caused to display the information written by the writing instrument.

A data input device comprising a rigid resistive layer provided as a resistive paper sheet is known from German Laid-open 23 19 460. This device is provided with a plurality of contact point electrodes arranged at equal distances along the edge of the resistive paper sheet. The electrodes of each of the four edge portions are respectively connected among each other by resistances.

It is an object of the present invention to provide a data input device with a pressure-sensitive input surface wherein the position detection of the writing pen is performed by electric signals without a direct electric contact being generated between the conductive layer and the resistive layer.

For solving the above object, there is proposed, in accordance with the invention, a data input device having pressure-sensitive input surface, said data input device comprising an input surface adapted to be locally exposed to a pressure or a pressing force particularly by a pen, a writing instrument or the like or by finger pressure, a resistive layer arrangement comprising at least four mutually spaced electrodes, with two electrodes, respectively, being arranged in pair-wise configuration opposite each other with a distance therebetween, an electrically insulating and at least partially dielectrical arrangement of deformable layers, arranged between the input surface and the resistive layer arrangement, which on application of a force at a pressure point of the input surface is locally deformed in such a manner that the thickness of the deformable layer arrangement is reduced at the pressure point, the deformable layer arrangement still having a thickness different from zero even on application of a maximum allowable pressure or a maximum allowable force at the pressure point, a further electrode spaced from the resistive layer arrangement by at least the deformable layer arrangement, the distance of said further electrode from the resistive layer arrangement at the pressure point being reduced corresponding to the pressure or the pressing force, and an evaluating means electrically connected to the electrodes of the resistive layer arrangement and to said further electrode and receiving electric signals from these electrodes, said electric signals representing, on the one hand, the local capacitance of the deformable layer arrangement between said further electrode and the resistive layer arrangement at the pressure point and, on the other hand, the resulting electric partial resistances of the resistive layer arrangement between the pressure point and the electrodes of the resistive layer arrangement, and the evaluating means, on the basis of the capacitance and the resulting electric partial resistances, detecting and outputting data indicating the position of the pressure point within the input surface and the pressure and/or the pressing force.

The data input device of the invention is provided with a preferably rigid resistive layer arrangement comprising at least four mutually spaced electrodes, with two electrodes respectively being arranged in pair-wise configuration opposite each other at distances. This resistive layer arrangement can comprise a single resistive layer with electrodes arranged on its four edges. However, it is also possible to provide two resistive layers with an insulating layer therebetween, each resistive layer comprising two confronting electrodes and the orientation of the two electrode pairs of the two resistive layers being turned by 90° against each other. Between the input surface and the resistive layer arrangement, there is arranged a deformable layer arrangement comprising an electrically insulating and at least partially dielectric material being preferably elastically deformable. On the side of the deformable layer arrangement facing away from the resistive layer arrangement, there is arranged a further electrode. Said further electrode is spaced from the resistive layer arrangement by at least the deformable layer arrangement. Said further electrode can be an electrically conductive layer arranged e.g. adjacent the deformable layer arrangement, or the pen or the writing instrument by which writing or drawings are applied on the input surface or pressure is exerted thereon in some other manner. Thus, a capacitive coupling exists between said further electrode and the resistive layer arrangement. When pressing on the input surface, also the distance between the further electrode and the resistive layer arrangement is changed, notably at the pressure point of the input surface, which happens because of the deformability of the deformable layer arrangement. In an equivalent circuit diagram, the capacitive coupling between the further electrode and the resistive layer arrangement can be described as a capacitor having one terminal connected to the further electrode at the pressure point and having its other terminal connected to the resistive layer arrangement in that position which in the projection is located below the pressure point.

The evaluating means of the data input device of the invention is electrically connected to the electrodes of the resistive layer arrangement and to the further electrode. On application of a voltage to all of the electrodes, the evaluating means receives electric signals therefrom. These electric signals represent, on the one hand, the magnitude of the (local) capacitance of the deformable layer arrangement between the further electrode and the resistive layer arrangement at the pressure point and, on the other hand, the resulting electric partial resistances of the resistive layer arrangement resulting from the respective distance between the projection of the pressure point onto the resistive layer arrangement and the two electrodes of an electrode pair. On the basis of these partial resistances, the position of the pressure point between the two electrodes of an electrode pair of the resistive layer arrangement can be detected. Thus, there is obtained one coordinate of the pressure point within the input surface. The other coordinate, i.e. the position of the pressure point with regard to the electrodes of the other electrode pair, is detected on the basis of the electric signals delivered by these electrodes. On the basis of the amount of the (local) capacitance, finally, there can be detected the pressure and/or the pressing force (when the surface measure of the pressure point is known or detected).

The deformable layer arrangement of the data input device of the invention is dimensioned and designed such that, also on application of a pressure or a force with the maximum allowable value onto the input surface, there is still enough material of the deformable layer arrangement located between the pressure point and the resistive layer arrangement, i.e. there will never occur an electric contact between the further electrode and the resistive layer arrangement. Thus, detection of the pressure or pressing force is always performed in a capacitive manner. Accordingly, the galvanic separation of the further electrode from the resistive layer arrangement is realized by suitable selection of the thickness of the deformable layer arrangement and its deformation resistance.

Preferably, the deformable layer arrangement comprises dielectric material with a comparatively large dielectric constant so that the deformable layer arrangement has a high capacitance. Most preferably, the deformable layer arrangement comprises a dielectric material merely over part of its thickness and otherwise comprises an electrically insulating material. Additionally, in this regard, it is advantageously provided that the further electrode is designed as an electrically conductive layer which is arranged on the side of the deformable layer arrangement averted from the resistive layer arrangement. In this constellation, the dielectric layer of the deformable layer arrangement faces towards the resistive layer arrangement, and the insulating layer of the deformable layer arrangement faces towards the conductive layer. The fact that the further electrode is formed as an electrically conductive layer has the advantage that the writing instrument is not connected to the evaluating means, which would be the case if the writing instrument itself were used as the further electrode.

As practice has shown, it is advantageous if the total layer arrangement of the data input device is suited for writing onto the input surface with a writing pressure of between 600 to 1000 $g/mm^2$. Preferably, the deformable layer arrangement comprises a porous or perforated elastically deformable plastic. If this plastic material itself has dielectric properties, these can be increased by providing the cavities of the plastic layer with a dielectric liquid material. If this is not the case, the dielectric properties of the plastic layer are determined exclusively by this dielectric material filling the cavities.

For elimination or at least a considerable reduction of possible disturbing factors, e.g. noise or external electric fields, it is advantageous to provide a (further) electrically conductive layer which is connected to an input of a differential amplifier having its other input connected to the further electrode. In this manner, a differential measurement of the electric signals of the electrodes takes place, improving the quality of the measuring results.

In order to eliminate or at least reduce the influences of electric interference fields, it is of advantage to shield the conductive layer used as the further electrode, and/or the resistive layer arrangement by a grounded layer. This further grounded layer which is electrically conducitve, is electrically insulated with respect to the electrode (conductive layer) or the resistive layer to be shielded.

In a further embodiment of the invention, the evaluating means comprises at least one filtering circuit which is connected to the further electrode. This filtering circuit is also connected or connectible to one of the confronting electrodes of an electrode pair of the resistive layer arrangement. If only one filtering circuit is provided, it is suitable to selectively connect the filtering circuit—via a controllable switch—to one of the two electrodes of the one or the other of the electrode pairs of the resistive layer arrangement. Preferably, there are provided two filtering circuits, one of these filtering circuits being connected to one of the two electrodes of the one electrode pair, and the other one of these filtering circuits being connected to one of the two electrodes of the other electrode pair. The two filtering circuits are preferably alternately connected to the electrode pairs such that always only one filtering circuit is connected with the associated electrode pair while the other filtering circuit is not connected to its respective electrode pair. The output signal of the filtering circuit upon application of an input voltage to the input of the filtering circuit serves for detection of the pressure or the pressing force acting at the pressure point, and of the position of the pressure point between the two electrodes of that electrode pair which has one electrode connected to the filtering circuit.

Preferably, the filtering circuit is provided with an operational amplifier whose inverting input is connected to the further electrode and whose output is connected or connectible to one of the two confronting electrodes of an electrode pair of the resistive layer arrangement. With this circuit configuration, the operational amplifier, when a pressure point is generated on the input surface, is connected by feedback to the inverting input via one of the two partial resistances of the resistive layer arrangement and the capacitance between the resistive layer at the pressure point and the further electrode. Preferably, the potential on the non-inverting input of the operational amplifier is equal to that of the other electrode of the electrode pair. This potential is preferably the mass potential. When applying a preferably constant DC voltage as an input voltage to the inverting input of the operational amplifier, which is done via an electric resistance, an output voltage is generated at the output of the operational amplifier as a (jump) response to the input voltage. The waveform of the output voltage is characterized by a voltage jump at the turn-on time of the input voltage and a voltage linearly increasing from then on. The rise of this linearly ascending leg is a measure for the capacitance and is inversely proportional thereto. The writing pressure itself is inversely proportional to the capacitance so that, in the end, the rise is proportional to the writing pressure.

The voltage jump at the turn-on time of the input voltage represents the location of the pressure point between the two electrodes of an electrode pair.

Preferably, the change of the output voltage, i.e. the increase of the output voltage subsequent to the voltage jump, is detected by sampling the output signal of the operational amplifier at two specified points of time after application of the input voltage, and the increase of the output voltage is detected from the difference of the output voltage at said two points of time and the time difference between the two points of time. This is effected preferably by suitable control of one or a plurality of sample-and-hold circuits connected at the output terminal side of the operational amplifier.

As evident from the above, the invention is based on the idea that by employing an only capacitive measuring method in a data input device, the further electrode, preferably formed as a conductive layer, and the resistive layer are separated in such a way that a direct electric contact between them is avoided. Thus, there are obtained an extended operating life and a higher reliability of the data input device. Further, the data input device of the invention is arranged in such a manner that, simultaneously with the measurement of the position of the pressure point, i.e. of the writing instrument, a measurement of the pressure or the pressing force is performed. The electric signals of the data input device are registerable and convertible into a table for thus obtaining the coordinates of the pressure point and the magnitude of the pressure at discrete times.

In the data input device of the invention, the continuous deformable layer arrangement between the further electrode (conductive layer) having a negligible resistance and the resistive layer arrangement having a comparatively high resistance, has dielectric properties. The capacitance of the capacitor consisting of the further electrode (conductive layer), the insulating deformable layer arrangement and the resistive layer arrangement, is increased locally at the position of the compression formed under the contact point, wherein at the same time the major part of the thus produced capacitance is located at the point of the resistive layer arrangement below the pressure site. In this manner, the registration of electric properties due to the thus changing capacitive properties of the data input means, which give a measure for the position of the tip of the writing instrument or merely of a pen or finger on the input surface, can be performed in different ways. These electric measuring properties can be converted into a computer readable table form, which represents the position coordinates by an evaluation electronics in the conventional way. It has turned out that different electric properties at the same time provide a measure for the magnitude of the pressure acting on the input surface at the pressure point. Insofar it is possible to simultaneously register the position coordinates and the pressure at discrete times.

The electric properties are in particular measured by impedance measurement, wherein the relation between the two partial resistances of the voltage divider is measured, which is formed respectively at the point below the trough-like depression (pressure site) towards both confronting electrodes of an electrode pair. At this point of the resistive layer arrangement, at the same time, the major part of the hereby produced capacitance is located. The ratio of the two partial resistances of the voltage divider is related to the position of the writing instrument between the two electrodes (i.e. either in x- or in y-direction).

Since between the layers located above each other no continuous galvanic connection is formed by pressure acting on the input surface and no current is transmitted by the layers in the direction of their thickness, the power dissipation of the data input device is recuded significantly, whereby, in addition thereto, no thermal stress is exerted. Since the insulating dielectric deformable layer arrangement between the further electrode (conductive layer) and the resistive layer arrangement can be formed in a very simple way, wherein a continuous construction comprised in a solid flexible composition of its materials can be made across the complete layer thickness, no wear or losses of material can be observed even after prolonged usage.

The formation of a dielectric insulating deformative layer can be effected in different ways. Preferably it is formed in two layers, wherein a second layer in the form of a thin flexible layer made of insulating material is located between the conductive layer and the original dielectric layer. This insulating layer serves for galvanic decoupling of the resistive layer arrangement with respect to the conductive layer. Thus, it is not required that the thickness of the original deformable dielectric layer and the stiffness of the material composing this layer is of such a magnitude that the galvanic separation of the conductive layer and the resistive layer arrangement is maintained even when a large writing pressure is applied.

The evaluation of the increase of capacitance at the point of the voltage division in the resistive layer due to the pressure of the writing instrument in this point is, according to the invention, done in a convenient way by detection of the magnitudes necessary for the calculation of the pressure and the position from the frequency- and phase-response of a filtering circuit, which is contained in the evaluating means of the data input device. Advantageously, in order to apply this evaluation method, the following measures are taken:

The data input device, for data registration of the input and output signals, comprises a reference voltage source actuatable by a control means, as well as a filtering circuit being supplied with the thus generated voltage and consisting of a resistance "R", an operational amplifier, the total layer arrangement comprising the four electrodes of the resistive layer arrangement and the further electrode, and of two analogue switches which on the longitudinal and transverse sides of the resistive layer arrangement make it possible—corresponding to the respective voltage sampling of the voltage divider—to perform a separate measurement of the x- and y-position signals through the partial resistance values in x- and y-direction. The inverting input of the operational amplifier is connected, on the one hand, via the resistance R with the switchable reference voltage source and, on the other hand, with the conductive layer. One of the two lengthwise sides of the resistive layer arrangement and one of the two electrodes associated to the transverse side of the resistive layer arrangement is connected to the two resting poles of one of the analogue switches. The switchable pole of this switching means, which in dependence of the switch position is connected to the one or the other resting pole, is connected to ground just as the non-inverting input of the operational amplifier. The output of the operational amplifier is connected to the switchable pole of the other analogue switch whose resting poles are connected to the two still remaining electrodes of the two electrode pairs. The switching of the two analogue switches is performed in such a manner that measurements in longitudinal and transverse directions can be carried out independently of each other. The output of the filtering circuit is connected to at least one sample-and-hold amplifier which is followed by an analogue/-digital converter; the sample-and-hold amplifier is connected to a control unit so as to be controlled thereby for the sampling of measurement points at points of time determined by the control unit. The control unit is further used to drive the analogue switches for separate measurement of the position signals in x- and y-direction and for switching the reference voltage. After activation of the reference voltage (voltage jump), at least two measurement values are sampled from the jump response function of the filtering circuit; from these measurement values (voltage levels), it is possible to calculate the rise and the voltage jump or stroke at the starting time of the jump response function. The position of the x-coordinate or the y-coordinate of the pressure point is obtained from the relation $$a = \frac{U_{E0} R_1}{R} \text{ as well as } x \sim R_1$$

and the pressure P is obtained from the relation $$b = \frac{U_{E0}}{R \cdot C} \left(1 + \frac{R_1}{R_2}\right) \text{ with } P \sim \frac{1}{C}, \text{ thus } p \sim b,$$

with $R_1$ and $R_2$ being the two partial resistances of the voltage divider between the pressure point and the two electrodes of an electrode pair and $U_{E0}$ being the input voltage. From the partial resistances of the voltage divider between the two electrodes of the other electrode pair, the second coordinate can then be detected on the basis of the above first relation.

From the thus obvious relation of the partial resistances of the voltage divider in x- and y-direction, the x- and y-coordinates are given. Furthermore a measure for the writing pressure of the writing instrument is obtained since this pressure, according to the above second equation, is inversely proportional to the capacitance "C".

The writing pressure should therein amount to approximately 600–1000 g/mm², i.e. about 150 to 300 g. It has turned out, that at a pressure resistance of the input surface of more than 1,0 kg/cm², more than 200,000 signatures can be registered by one data input device.

The material of the deformable layer arrangement should therein preferably have a high dielectric constant, so that the layer itself features a high capacitance. Insofar it can be achieved by the formation of a dimple into the flexible, elastic or compressible material, which can, if necessary, be pushed out of the space between the conductive layer or the thin insulating layer and the resistive layer arrangement, that the change of capacitance produced in this place by the capacitor formed by the layered structure with the capacitance "C", can be measured more easily.

Preferably, the evaluation of the frequency and phase response of the filtering circuit can be performed in the simplest way by first entering a switchable reference voltage, wherein the switchable reference voltage source, perefereably comprising an analogue switch with a Zener diode or a reference diode in parallel, is employed. The Zener diode or reference diode can be short circuited to ground by the analogue switch and is connected to the supply voltage of the evaluation circuit via a resistance. The measurement of the output signal of the filtering circuit is carried out at discrete times.

The electrodes of the resistive layer arrangement are conductively connected to the resistive layer or the resistive layers. In this respect, it is adavantageous if the electrodes are connected to the layers in a tight manner, i.e. if they are, as it were, "welded" thereto. To this purpose, there is used a substrate layer, e.g. a circuit board having four electrodes, serving as printed conductors, arranged on its four edges. During manufacture of the data input device, the resistive layer is laid onto the circuit board. Then, the electrodes are subjected to such a high electric current flowing therethrough that the resistive layer at its faces bordering on the electrodes is heated and becomes pasty and, upon cooling, connects with the electrodes of the circuit board.

Also the evaluation method evident from the above description of the operation of the data input means, said method being provided for detection of the coordinates and the pressure or the pressing force from the signals of the successive layers to be sampled by the electrodes, forms part of the invention.

An embodiment of the invention will be explained in greater detail hereunder with reference to the drawing.

FIG. 1 shows a longitudinal section through the different layers of the data input device, where in the intermediate arrangement of deformable dielectric layers below the trough-like depression at the contact point of the writing instrument, the narrowing of this dielectric layer and the major part of the thereby produced capacitance in the dielectric layer is represented by a schematically drawn capacitor, which is connected to a voltage divider with the partial resistances $R_1$ and $R_2$ located in the lower resistive layer;

Figure 1:
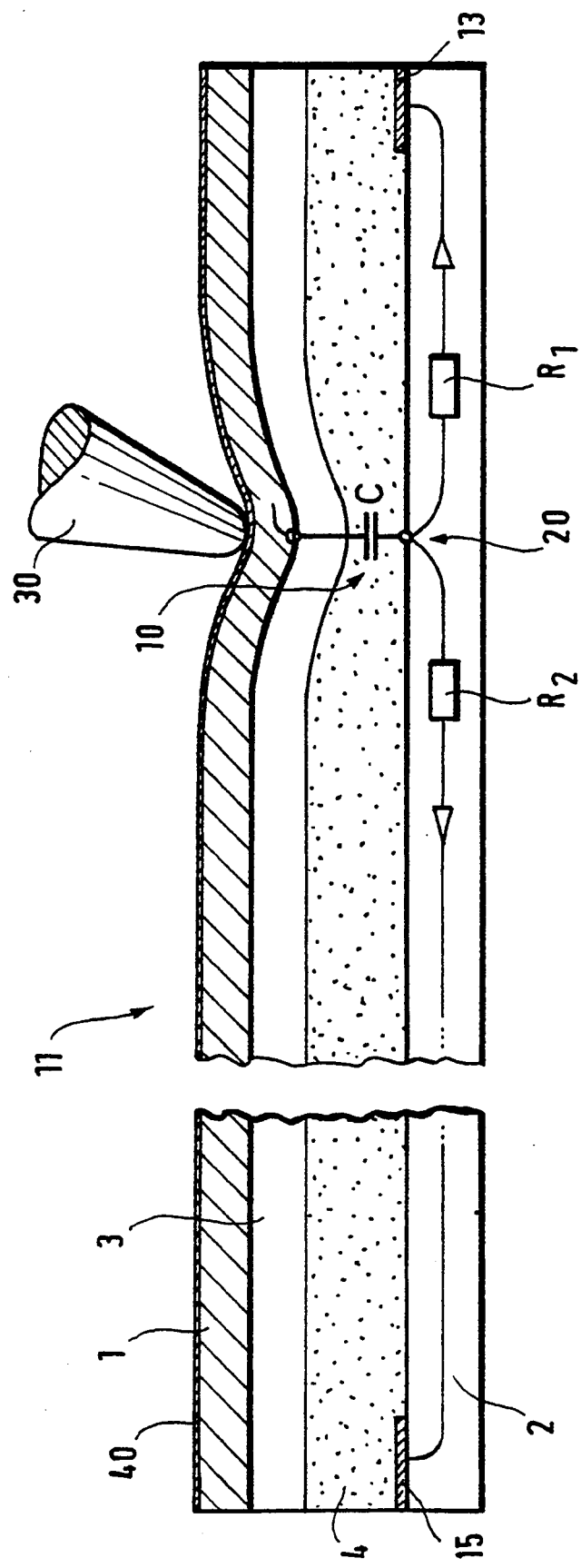

As can be seen from the section of the data input device 11 in FIG. 1, the device is composed of a thin and insulating upper cover-layer 40 in which the writing pad is provided. Below this cover-layer 40 the conductive layer 1 (shown by hatched lines) and below this the separate resistive layer 2 are located.

In order to avoid a direct electric contact between the conductive layer 1 and the resistive layer 2 in the case of pressure on the writing instrument, schematically shown at 30, on the input surface and the hereby created depression (see FIG. 1), a thin insulating layer 3 made of a thin flexible insulating material (for example PVC) and a dielectric layer 4 contacting the resistive layer 2 are situated between those layers. The dielectric material is flexible in such a manner or made of such an elastic solid material or liquid displacable material that, in the case of a pressure of the tip of the writing instrument 30, a depression is formed under the pressure point, so that here a decrease of the layers thickness is produced. An elastic rubber, having a large dielectric constant, can also be employed as a dielectric material.

As can be seen from the schematic view of FIG. 1, the formation of a more or less pronounced depression (depending on the pressure of the writing instrument on the elastic and flexible layer system), which is protruding into the elastic dielectric material and dislocating it from the space between the insulating layer 3 and the resistive layer 2 is observed. The capacitance "C" of a capacitor 10, which is shown symbolically in the compression of the dielectric material 4, is changed accordingly, wherein at the same time the major part of the thus produced change of capacitance is located between the bottom of the depression and the resistive layer. The higher the absolute value of the capacitance, the better measurable is such a change of capacitance. For that reason, a material of maximum possible dielectric constant is preferably used in layer 4. In difference to the circuit of the data input device in U.S. Pat. No. 4,636,582, in which the upper conductive layer 1 is connected directly to the midpoint of the voltage divider $R_1,R_2$, only one pole of the capacitor "C" is connected to the voltage divider in 20 in FIG. 1.

The absence of a direct electric contact between the upper conductive layer 1 and the resistive layer 2 results in a longer lifetime and a higher reliability of the data input device.

Figure 2:
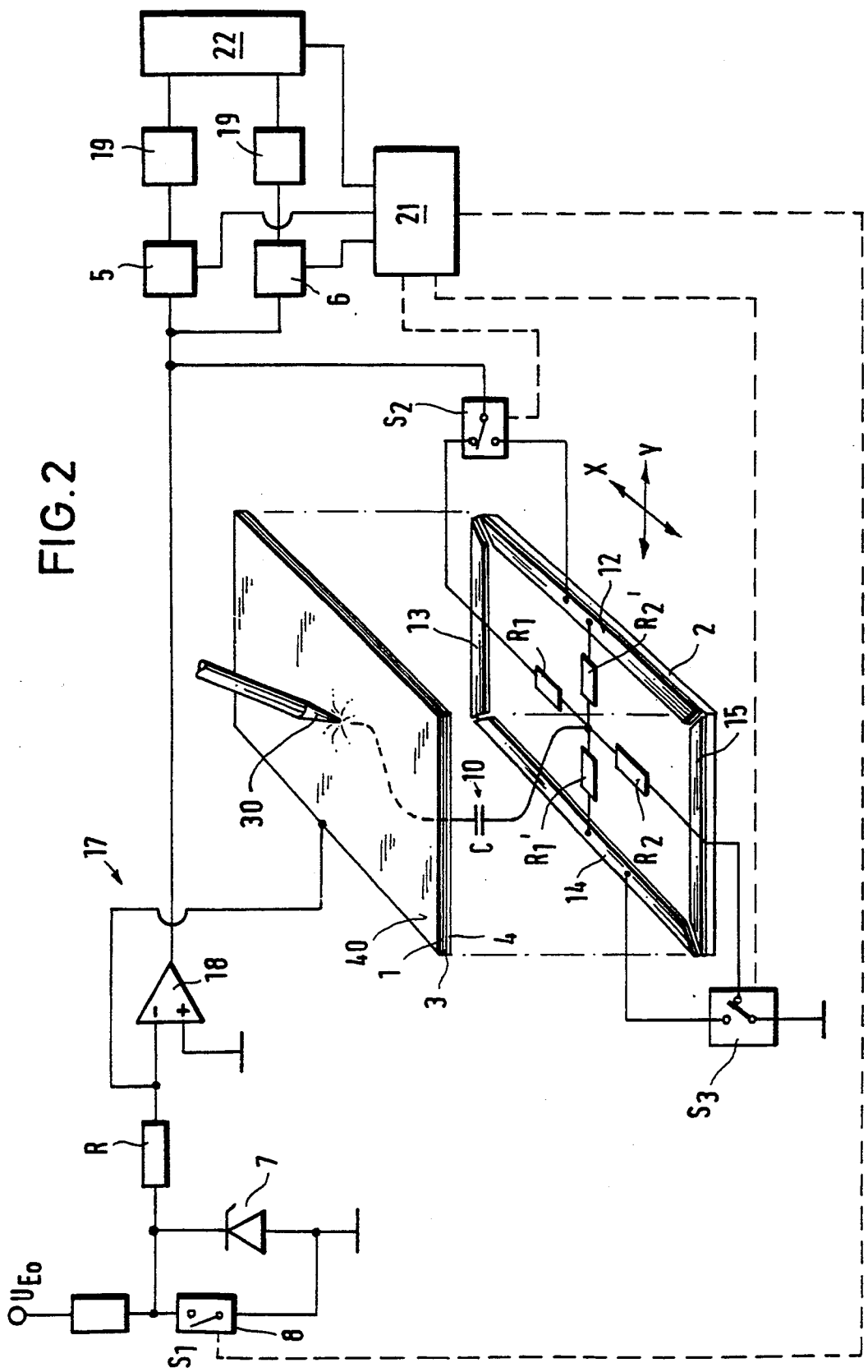
FIG. 2 shows an evaluation means of the data input device for connection to the partial resistances of the voltage dividers which are produced respectively below the depression inside the resistive layer and the capacity C of the dielectric layer occuring thereabove, the total layer arrangement being partially shown in exploded view.

As can be seen from the circuit for data collection according to FIG. 2, the evaluation circuit consists of an evaluation circuit having four leads to the terminals 12,13,14,15 of the resistive layer 3 of the data input device 11 and an additional lead to a terminal 16 of the conductive layer 1, wherein a connection with an operational amplifier 18 is made in the way shown in FIG. 2. Herein a switching between the two coordinate axes x,y of the resistive layer 2 having rectangular shape is achieved by two alternating switches with three contacts (for example semiconductor based analogue switches), wherein those switches are also triggered by a control unit 21 controlling the evaluation. By these connections a filtering circuit 17 is produced, whose frequency- and phase spectrum resulting from the switchable reference voltage source 7,8, is shaped in such a manner that by taking samples at the output, the electrical properties of interest (which are functions of the position 30 of the tip and the writing pressure) are evident.

The switchable reference voltage source 7,8 consists of an analogue switch $S_1$ and a Zener diode 7, which provides the input voltage for the filtering circuit 17 which has a resistance R leading to the inverting input of the operational amplifier 18, this operational amplifier and the actual data input device 11 with its five leads (four leads to the terminals 12,13,14,15 on the resistive layer 2 and one lead 16 to the conductive layer) in combination with two analogue switches for allowing a separate measurement in x- and y-direction.

The inverting input of operational amplifier 18 is connected to the switchable reference voltage source via the resistance R on one side and to the conductive layer 1 of the data input device or its input 16, respectively. The output of the operational amplifier 18 is connected via the analogue switch $S_2$ to the terminals 12,13 of the resistive layer 2, and its terminals 14,15 are connected by a further analogue switch $S_3$ to ground or the reference potential for connection to the transversal or longitudinal side of the resistive layer 3. It is therein twice a lead connected to the resting pole of an analogue switch $S_1,S_2$, one lead connected to the transversal and one lead connected to the longitudinal direction. The output of the operational amplifier is connected to the moving pole of one of the analogue switches and ground to the movable pole of the other analogue switch. The switching of the two analogue switches is performed in a way that allows an independent measurement in transverse and longitudinal direction.

By using the filtering circuit 17 in which the data input device is provided, the thus resulting jump response function is analyzed at least at two discrete times $t_1$ and $t_2$ by taking samples at the output of the filtering circuit. From the form of the obtained jump response function, the interesting quantities for position and pressure are obtained unambiguously.

The output of the filtering circuit 17 is therefore connected to two sample-and-hold amplifiers 5,6 which are followed by an analogue-to-digital converter. The sample-and-hold amplifiers allow to take and to store measured points at arbitrary times determined by the control unit 21. The switches $S_1,S_2$ and $S_3$ are triggered by this control unit 21 as well.

Figure 3:
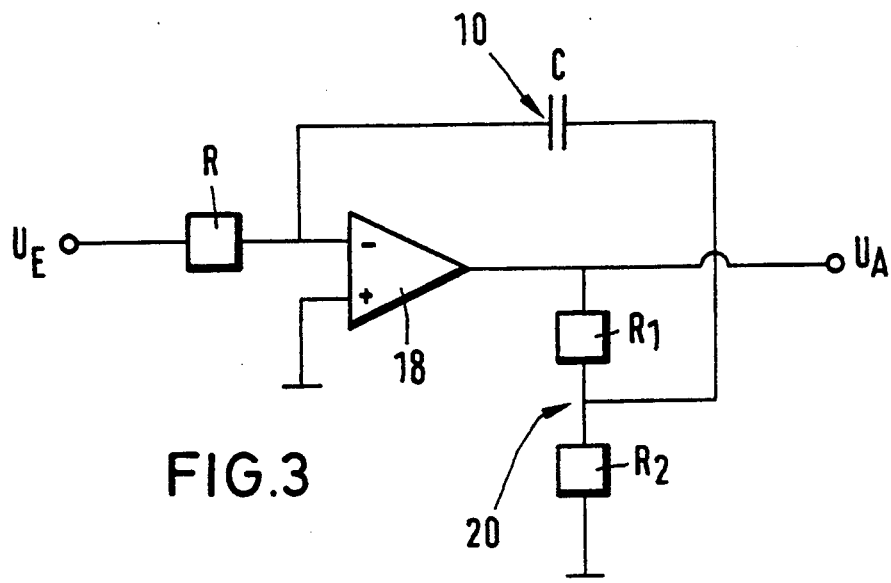
FIG. 3 shows a filtering circuit, as it appears when omitting the analogue switches for the x- and y-coordinate.
Figure 4A:
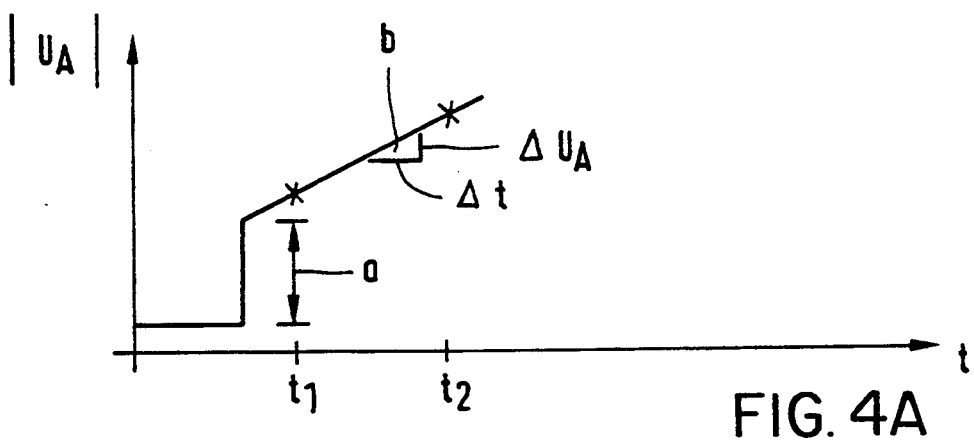
FIG. 4 illustrates the jump response function of the filtering circuit according to FIG. 3.

In FIG. 3 the filtering circuit is shown when the terminals 13 and 15 are electrically connected to the operational amplifier. In this circuity, the x-coordinate (and the writing pressure) can be determined on the basis of the voltage devider $R_1,R_2$ between the terminals 13 and 15 (and the capacitance C). The following description, in a corresponding manner is true for the circuity in which the terminals 12 and 14 are electrically connected to the operational amplifier 18 in order to determine the y-coordinate (and, if desired, the writing pressure) on the basis of the voltage devider $R'_1,R'_2$ between the terminals 12 and 14 (and the capacitance C).

A detailed analysis of this circuit shows that the transfer function is given by equation (1):

$$\frac{U_A}{U_E} = -\left(\frac{1}{i\omega RC}\left(1 + \frac{R_1}{R_2}\right) + \frac{R_1}{R}\right) \quad (1)$$

For reasons of greater simplicity the resistance "R" has been chosen to be equal to the total resistance of the data input device in one direction ($R=R_1+R_2$). (In y-direction in which between the terminals 12 and 14 there is formed the voltage devider resulting from the partial resistances $R'_1,R'_2$, the condition $R=R'_1+R'_2$ can be fulfilled in that the specific resistance or the resistance per area unit of the resistive layer in y-direction is different from that in x-direction. In case of an identical specific resistance or resistance per area unit in x- and y-direction, the switch $S_2$ or $S_3$ and the terminal pair comprising the less remote terminals 12,14, can have an additional resistance R' connected therebetween, thus obtaining the condition $R=R_1+R_2=R'_1+R'_2+R'$. If, as mentioned in the introductory part of the specification there are provided two filtering circuits adapted to be alternately connected to the different terminal pairs and comprising respectively a operational amplifier and a resistance R or R', respectively between the non-inverting input and the reference voltage source, then the resistances can be dimensioned such that the conditions $R=R_1+R_2$ and $R'=R'_1+R'_2$ are met.)

It can be seen that equation (1) is basically composed of two terms, one constant term which reflects the position of the tip of the writing instrument, and an integrating term containing the capacitance "C". In order to elucidate the behavior of the circuit in the time domain, $i\omega$ is replaced by the Laplace variable "s" and the jump response of the circuit is obtained by Laplace transformation.

$$U_A = -U_{E0} \cdot \frac{1}{S}\left(\frac{1}{SR \cdot C}\left(1 + \frac{R_1}{R_2}\right) + \frac{R_1}{R}\right)$$

$$= -\frac{1}{S^2} \frac{U_{E0}}{R \cdot C}\left(1 + \frac{R_1}{R_2}\right) + \frac{1}{S} \frac{U_{E0}R_1}{R}$$

$$\downarrow LT \qquad\qquad \downarrow LT$$

-continued $$U_A(+) = -t\frac{U_{E0}}{R \cdot C}\left(1 + \frac{R_1}{R_2}\right) - \frac{U_{E0}R_1}{R} \quad (2)$$

Considering absolute values of the output voltage $U_a$, equation (2) can be represented as shown in FIG. 3 as far as the jump response function of the circuit 17 is concerned.

The curve shows a jump of the height $a = U_{E0} \times (R_1/R)$ followed by a ramp having the slope $b = U_{E0}/(R \times C) \times (1 + R_1/R_2)$. It is thus obvious that by evaluation of a, the pen position (in a coordinate) can be obtained, since it is proportional to $R_1$ and we know the voltage $E_{E0}$ and the resistance R. With this the resistance $R_2$ can also be calculated easily and with the help of b the capacitive "C". Assuming the model of a plate capacitor for the capacitance "C", it is known from electrostatics that the value of the capacitance is inversely proportional to the plates distance, in the present case the bottom of the compression and the resistive layer. Now, use is made of the fact that b is also inversely proportional to the capacitance. Thereby b is altogether proportional to the distance of the compression and the resistive layer and thus a measure for the pressure of the pen onto the surface. In order to obtain a and b, corresponding responding to abscissa and slope of a line, independently, two points at different times are necessary. For that reason, two separate sample-and-hold amplifiers have been used. For transforming the analogue signals delivered by these amplifiers into digitalized form, both amplifiers have an analogue-to-digital converter 19 connected at their output side. The outputs of the analogue-to-digital coverters 19 are connected to an evaluating circuit 22 in which—controlled by the control unit 21—the delivered digital signals are to be evaluated in the above described manner for obtaining the x- or y-coordinate and the writing pressure.

By taking at least two samples at two discrete times $t_1, t_2$ from the jump response function of the filtering circuit 17, the calculation of the position coordinates (in x- and in y-direction) and the magnitude of the pressure can be performed immediately. An extrapolation of the jump response function based on the two samples is thus possible, giving evidence for the slope b and the abscissa a of the jump response function (at its switching on time).

By suitably frequent or fast switching of the alternating switches $S_2$ and $S_3$, the x- as well as the y-coordinate can be detected practically at every point which is run over by the writing instrument 30. By suitably frequent switching of the reference voltage (switching of switch $S_1$), the writing pressure, the x- and the y-coordinate can be detected practically at every point of a (pressure) line generated by the writing instrument. After being evaluated, the digital signals delivered by the analogue-to-digital coverters 19 can e.g. be stored as a writing pressure and x/y coordinates for later performing a comparison with stored values relating to a signature in order to verify the authenticity of that signature.

I claim:
1. A pressure sensitive data input device, comprising an input surface adapted to be locally exposed to an amount of pressure at a pressure point,
a resistive layer comprising at least two pairs of mutually spaced electrodes, each of the at least two pairs of mutually spaced electrodes being arranged in opposed, spaced relationship,
a deformable layer arranged between the input surface and the resistive layer, the deformable layer comprising at least one of an electrically insulating layer and a dielectric layer, the deformable layer having a thickness that, when an amount of pressure is applied to the input surface at the pressure point, is locally reducible to a non-zero thickness at the pressure point,
an electrode layer spaced from the resistive layer by at least the deformable layer, the distance between the electrode layer and the resistive layer at the pressure point being reducible in relationship to the amount of pressure applied at the pressure point, wherein the deformable layer defines a local capacitance between the electrode layer and the resistive layer at the pressure point and wherein the resistive layer defines corresponding resistances between the pressure point and the at least two pairs of mutually spaced electrodes,
evaluating means, electrically connected to the at least two pairs of mutually spaced electrodes and to the electrode layer, for receiving electric signals from the at least two pairs of mutually spaced electrodes, the electric signals representing the local capacitance and the corresponding electric resistances,
the evaluating means further comprising:
means for evaluating the local capacitance and the corresponding electric resistances and for outputting data indicating the amount of pressure at the pressure point and the position of the pressure point relative to the input surface,
a filtering circuit connected to the electrode layer and to at least one electrode of the at least two pairs of mutually spaced electrodes, and
means for generating an output signal upon application of an input voltage to the filtering circuit, the output signal indicating the amount of pressure at the pressure point and the position of the pressure point relative to at least two electrodes of the at least two pairs of mutually spaced electrodes.

2. The device of claim 1, wherein the deformable layer comprises dielectric material.

3. The device of claim 1, wherein the electrode layer comprises an electrically conductive layer located between the input surface and the deformable layer.

4. The device of claim 3, wherein the deformable layer comprises a dielectric layer and an electrically insulating layer, and wherein the resistive layer and the insulating layer both define sides which face the conductive layer.

5. The device of claim 1, wherein the input surface defines an unloaded condition, wherein the deformable layer defines an impedance having a surface density, and wherein the impedance of the deformable layer has a constant surface density over the input surface in the unloaded condition.

6. The device of claim 1, wherein the deformable layer comprises at least one of an elastically deformable material and a displacable material.

7. The device of claim 1, wherein the deformable layer comprises at least one of a porous elastically deformable plastic layer and a perforated elastically deformable plastic layer.

8. The device of claim 7, wherein the plastic layer defines a plurality of cavities and wherein the cavities are provided with a liquid dielectric material.

9. The device of claim 1, further comprising:
an additional electrically conductive layer,
a differential amplifier, in electrical communication with the additional electrically conductive layer, for performing a differential measurement of the electric signals from the at least two pairs of mutually spaced electrodes to thereby at least reduce interference.

10. The device of claim 1, further comprising a grounded layer for shielding at least one of the conductive layer and the resistive layer to thereby at least reduce the influence of disturbing electric fields.

11. The device of claim 1, comprising controllable switch means for selectively connecting the filtering circuit to at least one of a first electrode and a second electrode, the first electrode being associated with one of the at least two pairs of mutually spaced electrodes and the second electrode being associated with the other of the at least two pairs of mutually spaced electrodes.

12. The device of claim 1, wherein the filtering circuit comprises an operational amplifier having an inverting input, a non-inverting input, and an output, the inverting input being connectible to the electrode layer and the output being connectible to at least one electrode of the at least two pairs of mutually spaced electrodes.

13. The device of claim 12, wherein the non-inverting input defines a potential, wherein at least one electrode of the at least two pairs of mutually spaced electrodes defines a potential, and wherein the potential of the non-inverting input is substantially equal to that of the at least one electrode of the at least two pairs of mutually spaced electrodes.

14. The device of claim 12, comprising:
means for applying a substantially constant input voltage to the inverting input of the operational amplifier,
means for detecting the position of the pressure point relative to the input surface between two electrodes of an electrode pair based upon the magnitude of the output voltage of the operational amplifier when the input voltage is applied, and
means for detecting the amount of pressure at the pressure point based upon the magnitude of change of the output voltage.

15. The device of claim 13, comprising:
means for detecting a change in the output voltage by sampling the output signal of the operational amplifier at two different points of time after application of the input voltage, and
means for detecting an increase in the output voltage based upon a difference in the output voltage detected at the two points of time and the time difference between the two points of time.

* * * * *